US008327038B2

(12) United States Patent
Alcouffe et al.

(10) Patent No.: US 8,327,038 B2
(45) Date of Patent: Dec. 4, 2012

(54) SECURED SYSTEM FOR TRANSFERRING DATA BETWEEN TWO EQUIPMENTS

(75) Inventors: Fabien Alcouffe, Colombes (FR); Eric Weber, Cormeilles en Vexin (FR); Antoine Quentin, Antony (FR)

(73) Assignee: Thales, Neuilly sur Seine (FR)

( * ) Notice: Subject to any disclaimer, the term of this patent is extended or adjusted under 35 U.S.C. 154(b) by 293 days.

(21) Appl. No.: 12/444,491

(22) PCT Filed: Oct. 5, 2007

(86) PCT No.: PCT/EP2007/060613
§ 371 (c)(1),
(2), (4) Date: Apr. 30, 2010

(87) PCT Pub. No.: WO2008/040811
PCT Pub. Date: Apr. 10, 2008

(65) Prior Publication Data
US 2010/0211705 A1   Aug. 19, 2010

(30) Foreign Application Priority Data
Oct. 6, 2006   (FR) ..................... 06 08788

(51) Int. Cl.
*G06F 3/00* (2006.01)

(52) U.S. Cl. .................... 710/11; 710/4; 710/5; 710/20; 710/30

(58) Field of Classification Search .................. 710/4, 5, 710/11, 20, 30
See application file for complete search history.

(56) References Cited

U.S. PATENT DOCUMENTS

| 6,108,787 | A  | * | 8/2000 | Anderson et al. | 726/5 |
| 7,260,833 | B1 | * | 8/2007 | Schaeffer | 726/3 |
| 7,584,313 | B1 | * | 9/2009 | Hay et al. | 710/62 |
| 7,675,867 | B1 | * | 3/2010 | Mraz et al. | 370/254 |
| 8,139,581 | B1 | * | 3/2012 | Mraz et al. | 370/392 |

(Continued)

FOREIGN PATENT DOCUMENTS

WO   WO-96/30840 A   10/1996
WO   WO-2005119462 A   12/2005

OTHER PUBLICATIONS

Tenix PTY Limited: "Interactive Link Data Diode" May 4, 2006, p. 1 Internent www.tenix.com.
Tenix Datagate PTY LTD: "Network Separation for Information Asset Protection White Paper" [Online] 2002, Internet; www.tenix.com p. 4 and 5.

*Primary Examiner* — Chun-Kuan Lee
*Assistant Examiner* — Jasjit Vidwan
(74) *Attorney, Agent, or Firm* — Stroock & Stroock & Lavan LLP

(57) ABSTRACT

A system, apparatus and a method to connect at least two items of equipment, a first item of equipment having a first confidentiality level and a second item of equipment having a second confidentiality level, the two items of equipment in communication with equipment external to the system through the use of a protocol wherein the system includes at least: a medium allowing the transmission of data between the first and second items of equipment; an interface between the medium and the first item of equipment; an interface between the medium and the second item of equipment; first module to allow a first monodirectional adaptation of the protocol and to allow the transmission of data monodirectionally; and a second module to allow a second monodirectional adaptation of the protocol and to allow a reception of the data monodirectionally from the first module.

16 Claims, 3 Drawing Sheets

U.S. PATENT DOCUMENTS

2002/0151275 A1* 10/2002 Trost et al. .................. 455/41
2002/0167932 A1* 11/2002 McGowan .................. 370/349
2006/0156400 A1* 7/2006 Shevchenko .................. 726/22
2008/0259929 A1* 10/2008 Mraz .................. 370/395.1

* cited by examiner

SECURED SYSTEM FOR TRANSFERRING DATA BETWEEN TWO EQUIPMENTS

CROSS-REFERENCE TO PRIOR APPLICATION

This is a U.S. National Phase Application under 35 U.S.C. §371 of International Application no. PCT/EP2007/060613, filed Oct. 5, 2007, and claims benefit of French Patent Application No. 06 08788, filed Oct. 6, 2006, both of which are incorporated herein. The International Application was published in French on Apr. 10, 2008 as WO 2008/040811 under PCT Article 21 (2).

BACKGROUND OF THE INVENTION

The invention relates to a secure system for transferring information between two items of equipment (arbitrarily named A and B). The system is monodirectional in the direction 'from A to B' and thus ensures the non-transmission (intentional or unintentional) of physical and/or logical information 'from B to A'.

The secure system is, for example, used between two items of equipment having different confidentiality levels so as to allow transfers in one direction while preventing any information leaks in the opposite direction.

A possible but nonlimiting application of the invention is its integration within a cable intended to interconnect two computers in a monodirectional manner.

It applies in any system where one wishes to restrict the flow or the transmission of information in one direction.

The processing of sensitive information sometimes requires that systems be partitioned. In a practical manner, these partitionings raise problems when information exchange between these systems is involved.

It is however sometimes tolerable for information exchanges to be performed in a specific direction although the exchanges in the other direction are prohibited.

For example, in the field of defense, the flow of information from an item of equipment with low security level to an item of equipment having a higher security level is tolerated although exchanges in the opposite direction are prohibited.

In another case of application, a company wishes to be able to make resources available to users via the Internet while avoiding any risk of attacks to the company network, emanating from the Internet (for example the dissemination of viruses).

Devices carrying out protocol conversions (for example, converters from USB to Ethernet, RJ 12, RS232, IR, Bluetooth, SCSI, DB 15) also exist in the business sector.

Cables for interconnecting computer equipment also exist, constituting a link between such equipment allowing the bidirectional dissemination of data.

Numerous software solutions which make it possible to filter transfers of information, such as firewall software, are also found. However, these solutions do not ensure physical monodirectionality and risk the possibility of the protection being overriden.

Although they may be effective, the solutions of the prior art present drawbacks, some of which are presented hereinafter.

The monodirectional transfer solutions based on Ethernet interfaces are designed to interconnect networks. For this purpose, they generally require the setting up of a certain amount of equipment such as servers (responsible for supporting the significant software burden which arises when services are made available to all users of a network); this renders these solutions bulky and expensive.

Each application using its own protocol, it is necessary to manage the monodirectional adaptation of each of them in particular.

In a more general manner, their bulk, their cost and their complexity make these solutions an answer that is ill-suited to a link between two stations only. Moreover, during their normal operation, these solutions are connected, on each side, at the network level and not at the station level. In the case where these solutions are implemented for a monodirectional link to the station, the latter's often single Ethernet interface is used. It is then no longer possible to be connected at one and the same time to the local network and to the solution.

The invention is based, notably, on a protocol adaptation within the link between the two items of equipment. Starting with for example a bidirectional protocol, such as the USB protocol or any other protocol, allowing data transfer, this protocol is adapted into a monodirectional protocol, the desired one.

Any protocol used in the field of information transmissions can be used.

SUMMARY OF THE INVENTION

The present invention includes providing a system taking, for example, the form of a cable equipped with USB connectors or "firewire" or any other connection facility for plugging into equipment, ensuring at one and the same time monodirectional transfer of information and compatibility at the level of the exchange protocols used by the various items of equipment.

The invention relates to a system making it possible to connect at least two items of equipment, a first item of equipment having a confidentiality level A and a second item of equipment having a confidentiality level B, the two items of equipment dialoguing with the exterior using a protocol characterized in that it includes at least the following elements:
- a medium allowing the transmission of data between A and B,
- a means for connecting the medium with the item of equipment A and a means for connecting the medium with the item of equipment B,
- a module allowing the monodirectional adaptation of the transmission protocol used, and the transmission of the data monodirectionally.

The monodirectional adaptation module includes, for example, a first module adapted to carry out the logical adaptations of the protocol and a module adapted to carry out the physical adaptation of the protocols, and a sender E and in that the module includes a module for the logical adaptation of the monodirectional protocol into a different protocol and a module for physical adaptation comprising a receiver R.

The transmission protocol is a bidirectional protocol of USB type, the transmission medium includes a cable comprising a USB connector at each of its ends.

The invention also relates to a method making it possible to connect at least two items of equipment, a first item of equipment having a confidentiality level A and a second item of equipment having a confidentiality level B, the two items of equipment dialoguing with the exterior using a protocol characterized in that it includes at least one step of transmitting the data from the item of equipment A to the item of equipment B through a module for adapting the monodirectional protocol to the protocol used for the data transfer.

The system according to an embodiment of the invention ensures notably the absence of information leaks from item of equipment B to item of equipment A. The system offers a portable solution in a compact space.

In the case of a cable, it uses the USB ports and/or Firewire of the computer stations to which it is connected, thus allowing free access to the other ports, for example the Ethernet ports.

Compatibility with the protocols used (USB or firewire or any other protocol for plugging into an item of equipment) is complete and does not therefore require any modification of the items of equipment as long as they manage this protocol.

It is simpler to set up than the alternative systems known from the prior art and does not require any specialist for its installation or its administration.

BRIEF DESCRIPTION OF THE DRAWINGS

Other characteristics and advantages of the present invention will be more apparent on reading the description which follows, given by way of wholly nonlimiting illustration together with the appended figures which represent:

FIG. 1 illustrates the connection of two computer stations (station A and station B) by means of a cable implementing an embodiment of the invention and using USB interfaces. The cable is equipped with a device 10 ensuring on the one hand compliance with the protocols used for connecting the cable to the computer stations (here the USB protocol on both sides) and on the other hand the flow of information in a monodirectional manner from station A to station B. Monodirectional transmission is ensured by the fact that one of the modules 3.2a is equipped with a sender E and that the other 3.2b is equipped with a receiver R.

Figure 1:
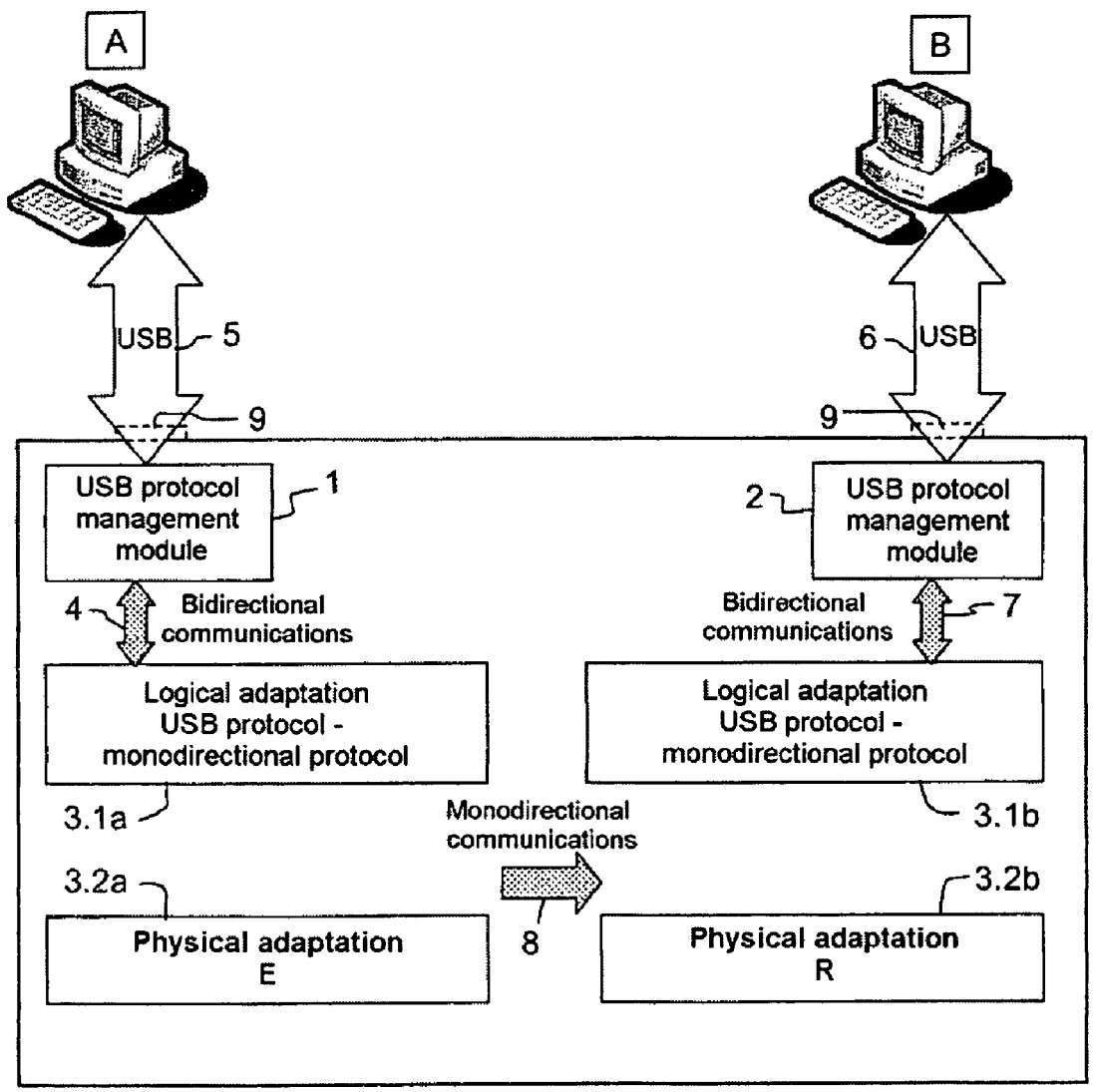
FIG. 1, a layout of the device according to an embodiment of the invention.

The device includes various modules:

[1] A module 1 for managing the bidirectional protocol with station A, ensuring standard operation of the USB bidirectional protocol between the cable 5 and station A. This module manages notably the acknowledgments necessary for the proper operation of the protocol.

[2] A module 2 for managing the bidirectional protocol with station B ensuring standard operation of the USB bidirectional protocol between the cable 6 and station B.

[3] Two modules 3a, 3b whose function is a monodirectional adaptation of these two protocols between the two abovementioned management modules 1, 2.

The module 3a includes for example a first module 3.1a whose function is to carry out the logical adaptations of the USB protocol, for example, monodirectional protocol; and a module 3.2a whose function is the physical adaptation of the protocols. This module 3.2a includes a sender E.

The module 3b includes, in an identical manner, a module 3.1b for the logical adaptation of the monodirectional protocol into a USB protocol or else into a bidirectional protocol and a module 3.2b for physical adaptation comprising a receiver R.

The communications are bidirectional, 4, between the module for managing the USB protocol and the module 3.1, monodirectional, 7, between the module 3.1 and the module 3.2 and bidirectional, 8, between the module 3.2 and the module 2 for managing the USB protocol.

In this exemplary embodiment, the cables 5 and 6 are equipped with connectors of USB type, 9.

Figure 2:
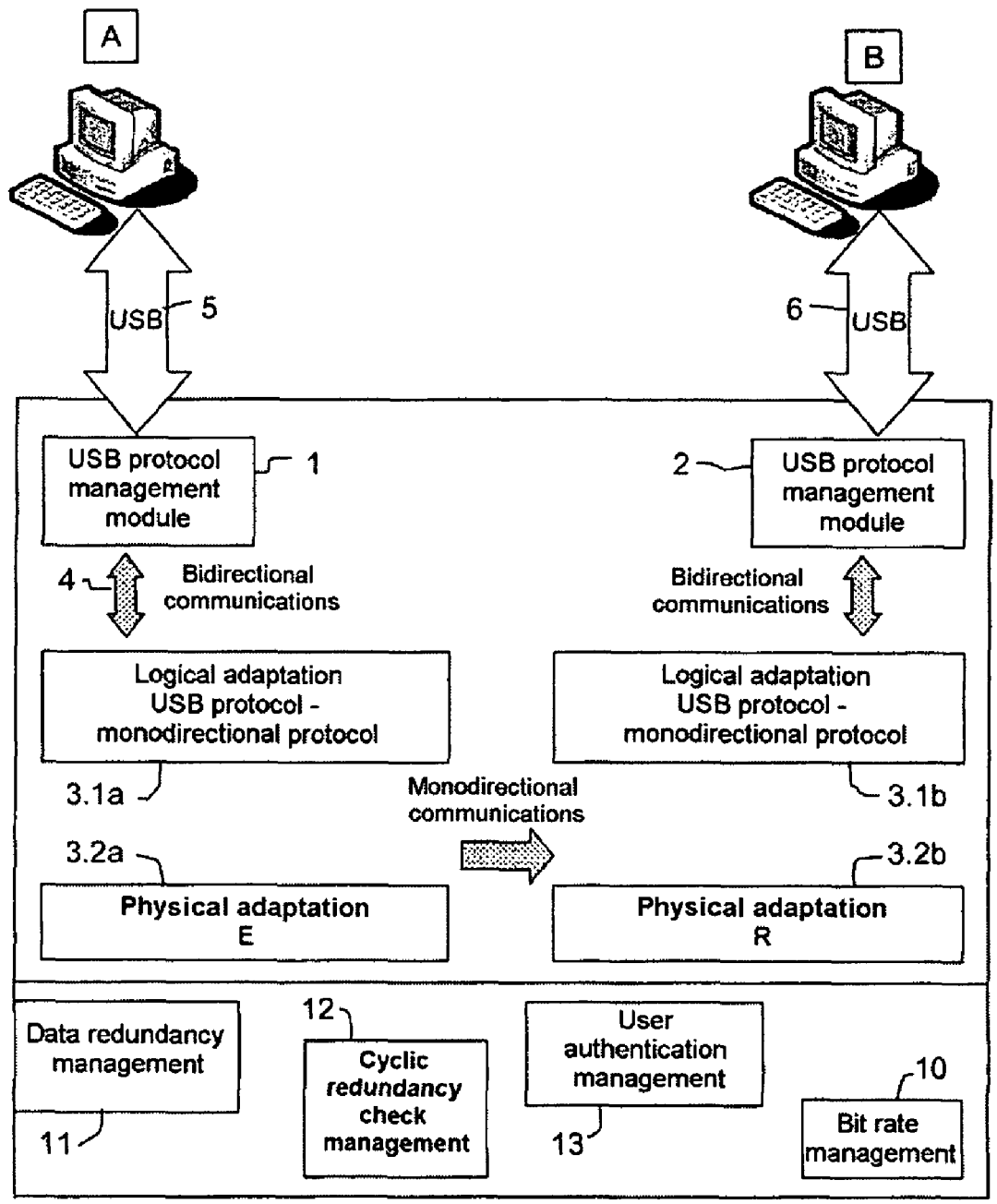
FIG. 2, various modules that may be integrated into the device according to an embodiment of the invention, and FIG. 3, a variant implementation of the invention.

In addition to these modules may be found a certain number of modules, represented functionally in FIG. 2 and offering some or several of the following functions:

A module 10 for managing the bit rates at the level of the 'USB protocol—Monodirectional protocol' adaptation making it possible to limit the bit rate of the monodirectional link by 'asking' the low station to reduce the bit rate on the USB link, A module 11 for the redundancy management of the transmitted data so as to decrease the probabilities of poor transmission (or of non-transmission) of the data within the monodirectional link, A cyclic redundancy check management module 12 (of CRC type) allowing verification of the integrity of the data received at the level of the 'Monodirectional Protocol Adaptation—USB protocol' module, A user authentication management module 13.

Power is supplied to the system according to an embodiment of the invention either through the use of an exterior source, or by using the power supply sources available via the interfaces used (for example, use of the power supplies dispensed by the USB buses).

Once the cable 5, 6 has been connected to station A on the one hand and to station B on the other hand, the system operates in the manner described hereinafter (the case of the use of an embodiment of the invention within a cable using USB interfaces to establish a monodirectional link between two computer stations A and B in the direction from station A to station B).

The data transmitted by station A travel via the USB connection 5 up to the USB management module 2 on the cable.

Thereafter, the module for adapting the USB protocol to a monodirectional protocol 3.1a, forwards these data to the module for adapting the monodirectional protocol 3.1b to the USB protocol. This can be done in several different ways (some of which are given by way of nonlimiting examples):

Recovery of the USB frames which are transmitted as is without modification by the adaptation module, Re-encapsulation of the USB frames in a proprietary or non-proprietary (but necessarily monodirectional) protocol for sending through the monodirectional link, Recovery of the data alone (without the information related to the USB protocol) for sending as is through the monodirectional link, Re-encapsulation of the data alone (without the information related to the USB protocol) in a proprietary or non-proprietary (but necessarily monodirectional) protocol for sending through the monodirectional link.

Figure 3:
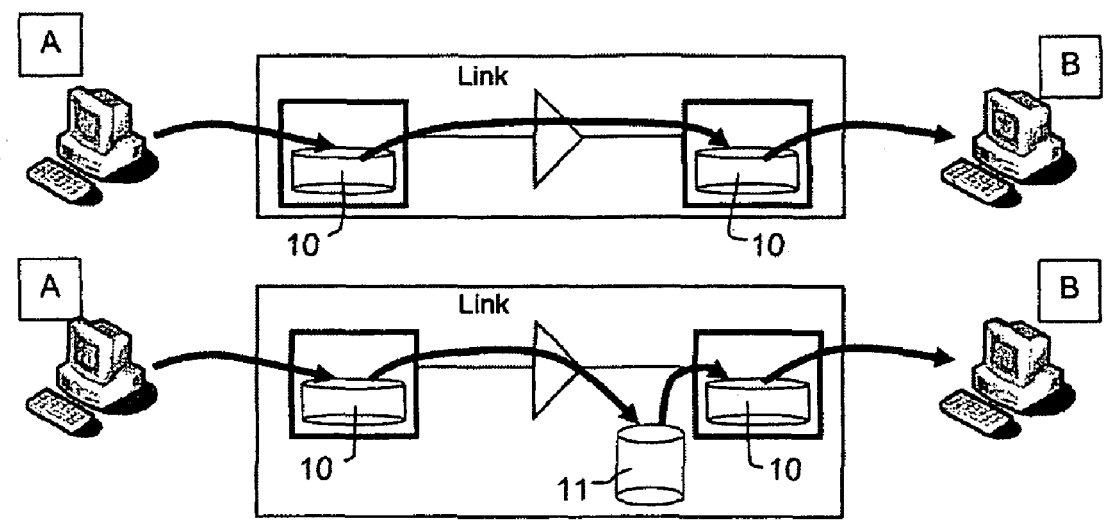

These actions can be performed on the fly (use of buffer memories only referenced 10 in FIG. 3) or in several stages via the data passing through intermediate memories referenced 11.

Finally, the data thus received by the 'monodirectional protocol—USB protocol' adaptation module are sent to the USB management module which is then responsible for transmitting them to station B while complying with the USB protocol.

The two modules for managing the USB protocol also have responsibility for managing the recognition of the cable by the two stations A and B.

Without departing from the scope of the invention, the method and the device described above apply in any system which requires the transfer of information in a determined direction and adaptation of the protocol used for the transmission of information.

An embodiment of the invention can apply in the case of systems implementing an optical conversion of the signal sent from computer station A to computer station B. In this case, the box 3.2a is equipped with an optical sender and box 3.2b is equipped with an optical receiver, the transmission medium consists of an optical fiber.

The invention claimed is:

1. A system to connect at least two items of equipment, a first item of equipment having a first confidentiality level and a second item of equipment having a second confidentiality level, the first and second items of equipment in communication with equipment external to the system by use of a protocol, wherein the system comprises:
    a medium to allow a transmission of data between the first and second items of equipment;
    a first interface between the medium and the first item of equipment;
    a second interface between the medium and the second item of equipment;
    a first module which interfaces with the first item of equipment to allow a first monodirectional adaptation of the protocol and to allow the transmission of data monodirectionally; and
    a second module which interfaces with the second item of equipment to allow a second monodirectional adaptation of the protocol and to allow a reception of the data monodirectionally from the first module,
    wherein the monodirectional adaptation includes a logical adaptation and a physical adaptation, and
wherein the first and second modules each comprise:
    a first submodule adapted to carry out the logical adaptation of the protocol between a monodirectional protocol and a different predetermined protocol; and
    a second submodule adapted to carry out the physical adaptation of the protocol between the monodirectional protocol and the different predetermined protocol, and
wherein the protocol is a USB protocol, and each first submodule is configured to:
    recover USB frames which are transmitted without modification by the first submodule;
    re-encapsulate the USB frames in one of a proprietary protocol or a non-proprietary monodirectional protocol to send through the monodirectional link;
    recover the data without the information related to the USB sending protocol; and
    re-encapsulate the data without the information related to the USB sending protocol.

2. The system as claimed in claim 1, wherein the protocol comprises a bidirectional USB protocol and the medium comprises a cable having a USB connector at each of its ends.

3. The system as claimed in claim 2, wherein the system further comprises a module to manage the bit rates at the level of the adaptation between the USB protocol and a monodirectional protocol.

4. The system as claimed in claim 1, further comprising a module for redundancy management of the transmitted data.

5. The system as claimed in claim 1, further comprising a cyclic redundancy check management module.

6. The system as claimed in claim 1, further comprising a user authentication management module.

7. The system as claimed in claim 1, further comprising a module for redundancy management of the transmitted data.

8. The system as claimed in claim 1, further comprising a cyclic redundancy check management module.

9. The system as claimed in claim 1, further comprising a user authentication management module.

10. A method to connect at least two items of equipment, wherein a first item of equipment has a confidentiality level A and a second item of equipment has a confidentiality level B, the first and second items of equipment in communication with equipment external to the first and second items of equipment by use of a protocol, wherein the method comprises one or more steps of transmitting data from the first item of equipment to the second item of equipment through:
    a first submodule adapted to carry out the logical adaptation of the protocol between a monodirectional protocol and a different predetermined protocol; and
    a second submodule adapted to carry out the physical adaptation of the protocol between the monodirectional protocol and the different predetermined protocol;
wherein the protocol is a USB protocol, and the method comprises the steps of:
    recovering USB frames which are transmitted without modification by the first submodule;
    re-encapsulating the USB frames in one of a proprietary protocol or a non-proprietary monodirectional protocol to send through the monodirectional link;
    recovering the data without the information related to the USB sending protocol; and
    re-encapsulating the data without the information related to the USB sending protocol.

11. An apparatus to connect at least two items of equipment, a first item of equipment having a first confidentiality level and a second item of equipment having a second confidentiality level, the first and second items of equipment in communication with equipment external to the apparatus by use of a protocol, wherein the apparatus comprises:
    a first interface between a transmission medium and the first item of equipment;
    a second interface between the transmission medium and the second item of equipment;
    a first module which interfaces with the first item of equipment to allow a first monodirectional adaptation of the protocol and to allow the transmission of data monodirectionally; and
    a second module which interfaces with the second item of equipment to allow a second monodirectional adaptation of the protocol and to allow a reception of the data monodirectionally from the first module,
    wherein the monodirectional adaptation includes a logical adaptation and a physical adaptation; and
wherein the first and second modules each comprise:
    a first submodule adapted to carry out the logical adaptation of the protocol between a monodirectional protocol and a different predetermined protocol;
    a second submodule adapted to carry out the physical adaptation of the protocol between the monodirectional protocol and the different predetermined protocol;
wherein the protocol is a USB protocol, and each first submodule is configured to:
    recover USB frames which are transmitted without modification by the first submodule;
    re-encapsulate the USB frames in one of a proprietary protocol or a non-proprietary monodirectional protocol to send through the monodirectional link;
    recover the data without the information related to the USB sending protocol; and
    re-encapsulate the data without the information related to the USB sending protocol.

12. The apparatus as claimed in claim 11, wherein the protocol comprises a bidirectional USB protocol.

13. The apparatus as claimed in claim 12, wherein the apparatus further comprises a module to manage the bit rates at the level of the adaptation between the USB protocol and a monodirectional protocol.

14. The apparatus as claimed in claim 11, further comprising a module for redundancy management of the transmitted data.

15. The apparatus as claimed in claim 11, further comprising a cyclic redundancy check management module.

16. The apparatus as claimed in claim 11, further comprising a user authentication management module.

* * * * *